(12) United States Patent
Chellappa et al.

(10) Patent No.: US 9,952,902 B1
(45) Date of Patent: Apr. 24, 2018

(54) DETERMINING A SET OF APPLICATION RESOURCES

(71) Applicant: Amazon Technologies, Inc., Reno, NV (US)

(72) Inventors: Sridhar Chellappa, Karnataka (IN); Jacek Stolcman, Laguna Beach, CA (US)

(73) Assignee: Amazon Technologies, Inc., Reno, NV (US)

( * ) Notice: Subject to any disclaimer, the term of this patent is extended or adjusted under 35 U.S.C. 154(b) by 840 days.

(21) Appl. No.: 13/860,359

(22) Filed: Apr. 10, 2013

(51) Int. Cl.
*G06F 9/44* (2006.01)
*G06F 9/46* (2006.01)
*G06F 9/50* (2006.01)

(52) U.S. Cl.
CPC ..................................... *G06F 9/50* (2013.01)

(58) Field of Classification Search
None
See application file for complete search history.

(56) References Cited

U.S. PATENT DOCUMENTS

| | | | |
|---|---|---|---|
| 6,086,618 A * | 7/2000 | Al-Hilali et al. ................. 703/2 | |
| 6,377,907 B1 * | 4/2002 | Waclawski ..................... 702/182 | |
| 6,725,454 B1 * | 4/2004 | Nagel et al. .................... 718/100 | |
| 7,433,311 B1 * | 10/2008 | Kalyanasundaram ....................... H04L 41/5029 370/235 | |
| 7,464,014 B2 * | 12/2008 | Nace et al. ....................... 703/13 | |
| 8,271,651 B1 * | 9/2012 | Wang ..................... H04L 67/303 709/219 | |
| 8,332,203 B1 * | 12/2012 | Poulin ............................. 703/22 | |
| 8,516,488 B1 * | 8/2013 | Brown .............. G06F 17/30463 707/718 | |
| 8,589,140 B1 * | 11/2013 | Poulin ................. G06F 11/3457 463/42 | |
| 8,595,489 B1 * | 11/2013 | Faaborg et al. ................ 713/166 | |
| 8,745,617 B1 * | 6/2014 | Stekkelpak et al. .......... 717/178 | |
| 2002/0174220 A1 * | 11/2002 | Johnson ................... H04L 67/42 709/224 | |
| 2005/0010502 A1 * | 1/2005 | Birkestrand ........... G06Q 30/04 705/34 | |
| 2005/0210262 A1 * | 9/2005 | Rolia ...................... H04L 67/30 709/226 | |
| 2005/0235288 A1 * | 10/2005 | Yamakabe ............ G06F 9/5072 718/100 | |
| 2006/0140115 A1 * | 6/2006 | Timus ..................... H04L 47/10 370/230 | |
| 2006/0161884 A1 * | 7/2006 | Lubrecht ............. G06F 11/3442 717/104 | |

(Continued)

*Primary Examiner* — Insun Kang
(74) *Attorney, Agent, or Firm* — Baker & Hostetler LLP (57) ABSTRACT

An application can be tested to determine whether declared resources for the application are deemed to be required for the application. Instructions can be sent to an operating system to launch the application, to simulate user interactions with the application, and to generate a log of resource requests by the application during launch of the application and during the simulated user interactions with the application. For each of the declared resources, a determination can be made whether a sufficient number of resource requests for the resource is in the log. If there are enough instances of resource requests for the resource in the log, the resource can be included in a list of actual resources for the application.

21 Claims, 8 Drawing Sheets

(56) References Cited

U.S. PATENT DOCUMENTS

| | | | |
|---|---|---|---|
| 2006/0265713 A1* | 11/2006 | Depro | G06F 11/3409 718/104 |
| 2007/0074174 A1* | 3/2007 | Thornton | G06Q 10/06 717/127 |
| 2008/0052719 A1* | 2/2008 | Briscoe | H04L 41/0806 718/104 |
| 2008/0155386 A1* | 6/2008 | Jensen | G06F 9/5083 715/201 |
| 2008/0313639 A1* | 12/2008 | Kumar | G06F 9/4881 718/104 |
| 2009/0257352 A1* | 10/2009 | Imai | H04L 43/024 370/241 |
| 2010/0330953 A1* | 12/2010 | Rogel et al. | 455/405 |
| 2011/0044354 A1* | 2/2011 | Wei | 370/468 |
| 2011/0131641 A1* | 6/2011 | Zubas et al. | 726/7 |
| 2011/0153591 A1* | 6/2011 | Heller | G06F 17/30312 707/713 |
| 2011/0213686 A1* | 9/2011 | Ferris | G06F 9/505 705/34 |
| 2012/0072529 A1* | 3/2012 | Ahopelto | H04L 12/5835 709/217 |
| 2012/0185462 A1* | 7/2012 | Albrecht | G06F 11/3409 707/718 |
| 2012/0317276 A1* | 12/2012 | Muniraju | H04L 41/14 709/224 |
| 2013/0006926 A1* | 1/2013 | Erofeev | 707/610 |
| 2013/0097203 A1* | 4/2013 | Bhattacharjee | G06F 21/604 707/783 |
| 2014/0245448 A1* | 8/2014 | Moon et al. | 726/25 |
| 2014/0282520 A1* | 9/2014 | Sabharwal | G06F 9/455 718/1 |

\* cited by examiner

DETERMINING A SET OF APPLICATION RESOURCES

BACKGROUND

Applications can be downloaded and installed on mobile computing devices. Applications can provide a wide variety of functions to users of mobile computing devices. To provide such functions, applications can request operations performed by one or more resources of the mobile computing device. For example, an application that has audio/video functions may request that an image or a video be displayed on the mobile computing device's display and that audio be output via a speaker or an audio output port of the mobile computing device. As different applications may provide different functionality to a user, the different applications may request different resources from the mobile computing devices upon which they are installed.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Application providers can make applications available for download onto computing devices. When applications are provided from developers to the application provider, developers can declare computing device resources that will be required to properly run the applications. Declared computing device resources for an application are the resources that the developer, or some other person or entity, has declared to be necessary for operation of the application. However, some computing devices may not be able to provide all of the resources declared for every application. Because users of computing devices could be frustrated by downloading an application that cannot operate on their computing devices, application providers may not show all applications as available for download to every computing device. In fact, when a user of a computing device views applications that are available for download, the application provider may permit the user to view only those applications where the computing device can provide the resources declared for the applications. In other words, an application can be discoverable by a user of a computing device only if the computing device can provide the resources declared for the application.

The capabilities of computing devices can vary widely, particularly among mobile computing devices. For example, a particular cell phone computing device may have a touch screen display, Wi-Fi network communication capability, cellular data network communication capability, Bluetooth communication capability and other capabilities. A particular tablet computing device may have a high-resolution touch screen display, Wi-Fi capabilities and other capabilities, but not cellular data network communication capability or Bluetooth communication capability. In the same example, an application provider can also provide a number of applications, including: Application A with Wi-Fi or cellular data network communication as declared resources, Application B with a touchscreen display and Bluetooth communication as declared resources, Application C with high-resolution touch screen as declared resources, and Application D with Bluetooth communication and high-resolution touch screen display as declared resources. With this example, when a user of the particular cell phone computing device views available applications for download, only Application A and Application B may be discoverable because the particular cell phone computing device can provide the resources declared for Application A and Application B; the particular cell phone computing device cannot provide the high-resolution touch screen resource declared for Application C and Application D may be discoverable because the particular tablet computing device can provide the resources declared for Application A and Application C; the particular tablet computing device cannot provide the Bluetooth communication resource declared for Application B and Application D.

In the examples from the preceding paragraph, neither the user of the particular cell phone computing device nor the user of the particular tablet computing device is able to view all of the applications provided by the application provider. In fact, Application D was not discoverable to either of the users. If the particular cell phone and the particular tablet computing device were the only computing devices that could view applications from the application provider, then Application D may never be discoverable. These limitations on the discoverability of applications may improve users' experience because users are not able to see or download applications that may not operate on their computing devices. However, at the same time the limitations on the applications that can be seen or downloaded reduce the apparent library of applications that can be downloaded to any one computing device. In the example from the preceding paragraph, the users could view only half of Applications A-D. Thus, each user saw a list of available applications that was only half of all of the applications that could be downloaded from the application provider.

Applications can sometimes have declared resources that are not actually necessary for operation of the application on a computing device. For example, an application may have Bluetooth capability as a declared resource when it does not actually need to use Bluetooth capability on a computing device to operate. Such an application can sometimes be called an "over-privileged" application, as it demands more privileges from computing devices than it actually requires. Applications can be over-privileged for any number of reasons. For example, a developer may mistakenly declare an unneeded resource for an application. In another example, a developer may declare a resource for an earlier version of an application when the resource is actually needed for the earlier version. A later version of the application may not need that declared resource, but the developer may not change the declared resources for the application leaving the later version of the application over-privileged. In another example, a developer may intentionally declare unneeded resources in an attempt to make an application appear more complex or sophisticated than it actually is. Many other examples may exist for reasons why an application is over-privileged.

Over-privileged applications can greatly affect discoverability of applications from application providers. If an application is over-privileged, it is possible that the application will not be discoverable by a computing device that does not have all of the declared resources for the application, even though the computing device may be able to provide all of the resources that are necessary for the application. Using the example of Applications A-D from above, it may be that Application D does not actually require Bluetooth capability to operate. In this scenario, Application D is over-privileged in that Bluetooth capability has been declared even though Bluetooth capability is not necessary for Application D to operate. When the user of the particular tablet computing device views available applications from the application provider, Application D would not be discoverable because the particular tablet computing device does not have the declared resource of Bluetooth capability even though Application D may be able to operate on the particular tablet computing device because Bluetooth capability is not actually required for operation of Application D.

In addition to testing for over-privileged applications, tests can be run to determine whether a certain application has malicious code, such as spyware or malware. It may be beneficial to an application provider to ensure the privacy of customers' data on their mobile devices. Spyware can be software that can gather information on a computing device, often without the consent or knowledge of the operator of the computing device. Spyware can send gathered information to another entity or assert control over the computing device. Malware can be software used or programmed by attackers to disrupt operation of a computing device, gather sensitive information, or gain access to a computing system. Malware can appear in the form of code, scripts, active content, and other software. When an application provider tests for malicious code, such as spyware and malware, before the application is published, users can have a high level of confidence that applications downloaded from the application provider will maintain the privacy of the data on the user's device.

Having over-privileged applications can harm an application provider. The application provider's set of discoverable applications for any given computing device may be smaller than it should be because some applications are over-privileged. Smaller sets of discoverable applications may result in fewer opportunities for users of computing devices to download applications. Fewer opportunities for users of computing devices to download applications may result in fewer downloads and therefore fewer purchases of applications. Few purchases of applications can result in less revenue for the application provider and the developers. In addition, the number of discoverable applications from application providers may be a factor considered by users of computing devices in deciding which application provider to use. Thus, one application provider's low number of discoverable applications for a computing device may cause a user of the computing device to use a different application provider.

Figure 1:
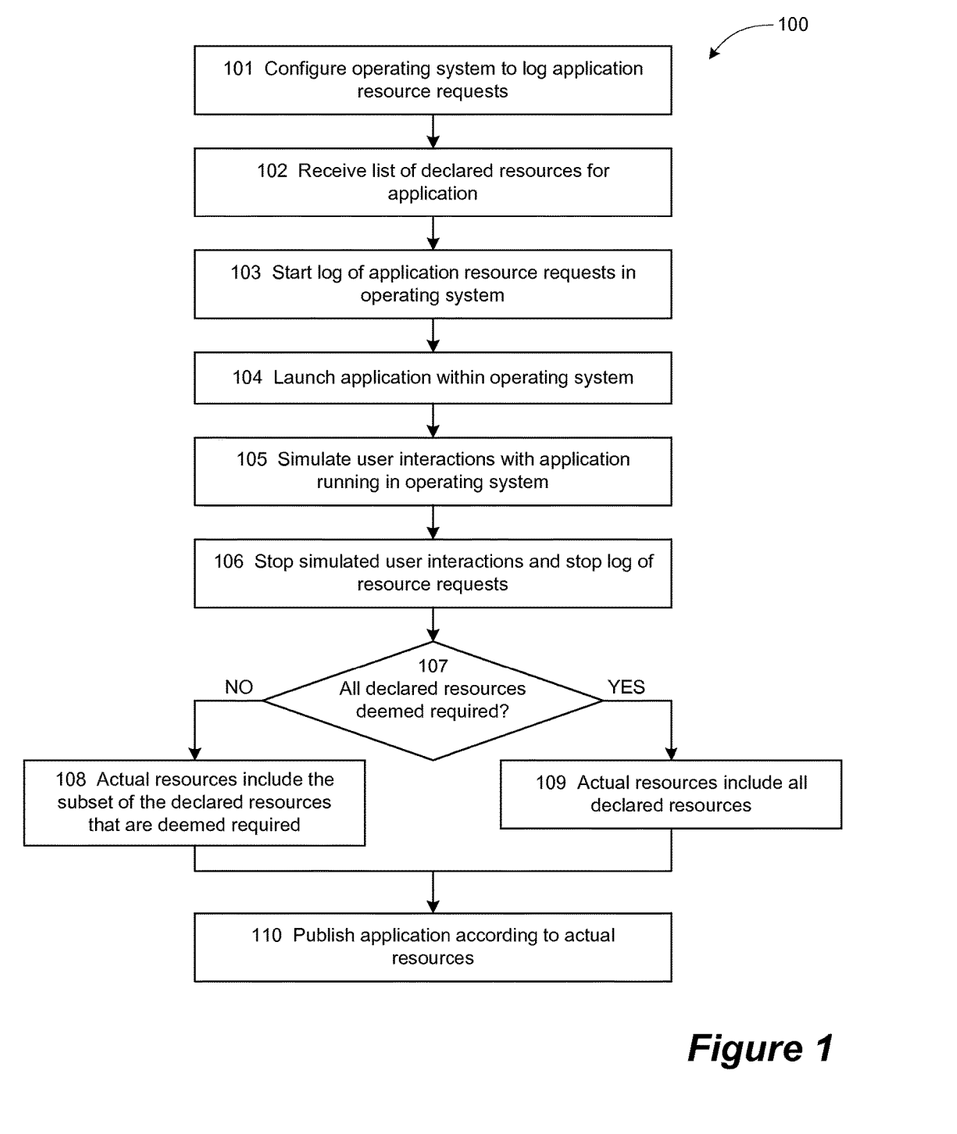
FIG. 1 depicts an embodiment of a method of determining actual resources used by an application based on resources declared for the application.

FIG. 1 depicts an embodiment of a computer-implemented method 100 of determining actual resources used by an application based on resources declared for the application. At block 101, an operating system can be configured to log application resource requests. In one embodiment, a management agent of the operating system can be configured to identify and log application resource requests from one or more applications operating within the operating system. In another embodiment, the operating system can be configured to log application resource requests by customizing or rebuilt the operating system to enable the operating system to store resource requests. Customizing or rebuilding an operating system in this way may be referred to as building an instrumented operating system. At block 102, a list of declared resources for the application can be received. The declared resources for the application can be received from the developer or from any other person or entity.

At block 103, a log of the application's resource requests can be started. At block 104, the application can be launched within the operating system. If needed, the application can be installed on the operating system before it is launched within the operating system. The act of launching the application may cause the application to make one or more resource requests. For example, the application may send a request to turn on a resource, such as a GPS unit or a Bluetooth transceiver, of the mobile computing device. Any resource requests made by the application can be logged in the log started at block 103.

At block 105, user interactions can be simulated for interacting with the application running on the operating system. Simulated user interactions can include any interaction that a user may have with the application, such as clicks, key presses, touches, gestures, system-level events and the like. The simulated user interaction can be random or pseudo-random interactions. The simulated user interactions can also be specifically created for the particular application. In one embodiment, simulated user interactions can be generated and executed to simulate many or all of the possible user interactions that can be accepted by the application. In another embodiment, simulated user interactions can be generated for execution within a predetermined amount of time, such as within five minutes. In another embodiment, the simulated user interactions can be executed by a management agent of the operating system. One example of a management agent is the ANDROID Debug Bridge. During the simulated user interactions, any resource requests made by the application can be logged in the log started at block 103.

At block 106, the simulated user interactions can be stopped and the log of the application's resource requests can be stopped. The completed log should contain a record of all of the resource requests made by the application during launch and during the simulated user interactions. At block 107, a determination can be made whether all of the declared resources are required. In one embodiment, a declared resource can be deemed to be required if a resource request for the declared resource appears in the log. However, it may be that the application makes one or a small number of resource requests for the resource even though the application does not require the resource to operate. For example, the application may send a request to turn on a Bluetooth transceiver of the computing device when the application is launched and then not make any subsequent requests of the Bluetooth transceiver during launch or the simulated user interactions. Thus, in another embodiment, a declared resource can be deemed to be required if there are more than a predetermined number of resource requests for the declared resource in the log. In another embodiment, a declared resource can be deemed to be required if the percentage of the resource requests for the declared resource to the total resource requests in the log is below a predetermined percentage. A resource can be deemed to be required based on the log in any number of alternate embodiments.

If, at bock 107, it is determined that not all of the declared resources are deemed to be required, then, at block 108, the actual resources for the application are those resources that are deemed to be required. However, if, at bock 107, it is determined that all of the declared resources are deemed to be required, then, at block 109, the actual resources for the application are the declared resources. Regardless of whether all of the declared resources are deemed to be required, a listing of the actual resources for the application can be stored by an application provider. At block 110, the application can be published according to the actual resources. Publishing the application according to the actual resources can include making the application discoverable to a user of a computing device that can provide the actual resources.

Using the embodiment of the method 100 depicted in FIG. 1, an application provider can test whether the resources declared for an application are the actual resources deemed to be required by the application. Using the actual resources to publish the application may increase the likelihood that the application will be discoverable by most or all of the computing devices upon which the application will properly operate. Moreover, using developer-declared resources to determine whether an application should be discoverable places the decision of whether the application should be discoverable in the hands of the developer. Instead, using the actual resources determined by the application provider to determine whether an application should be discoverable places the decision of whether the application should be discoverable in the hands of the application provider.

Figure 2:
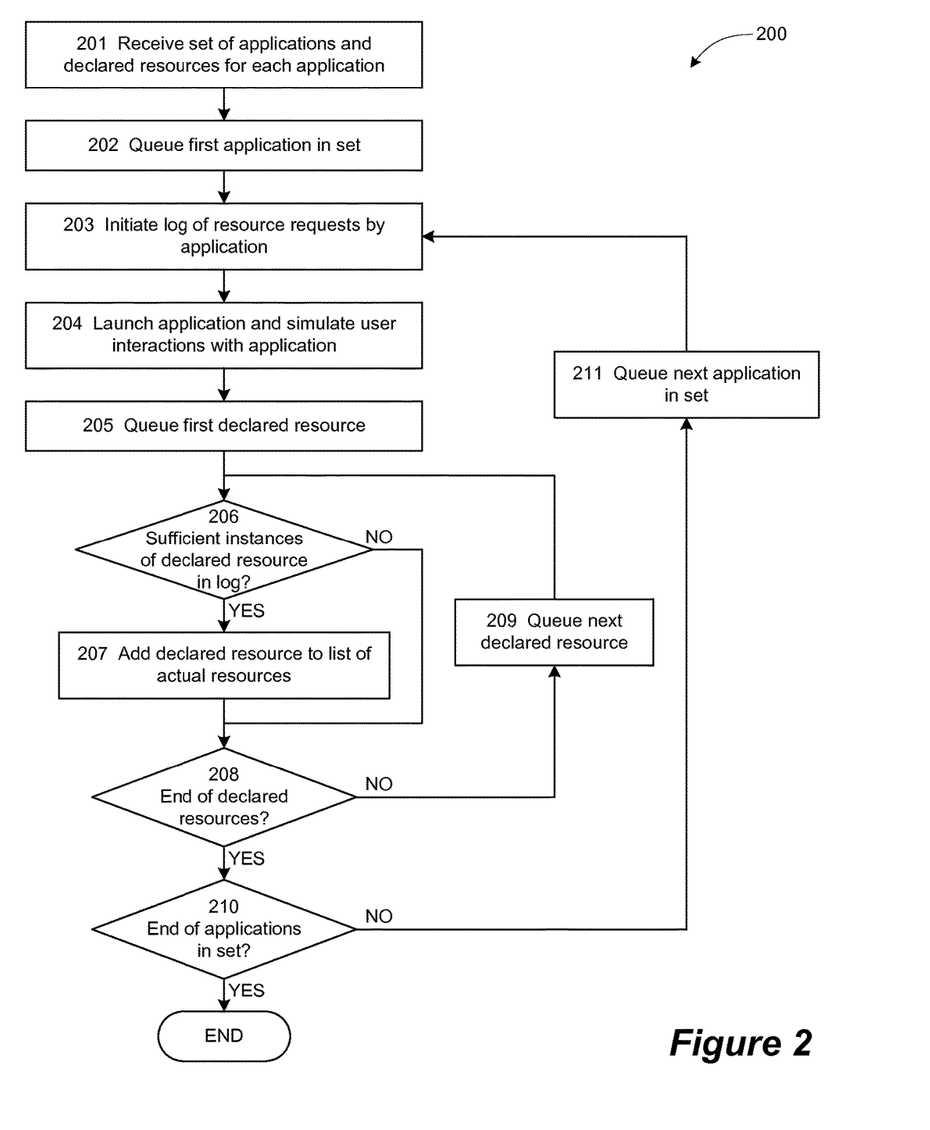
FIG. 2 depicts an embodiment of a method of determining actual resources used by a set of applications based on resources declared for each of the applications in the set of applications.

FIG. 2 depicts an embodiment of a method 200 of determining actual resources used by a set of applications based on resources declared for each of the applications in the set of applications. At block 201, a set of applications can be received and declared resources for each application can be received. The applications can all be from one developer or from different developers. The applications and the associated declared resources can be received at one time or over a period of time. At block 202, the first application in the set of applications can be queued for testing. Queuing the first application can include one or more of downloading the application onto a computing device, installing the application on an operating system, configuring the operating system to log resource requests by applications and the like.

At block 203, a log of resource requests made by the application can be initiated. The log can be kept by the operating system, by a component of the operating system such as a management agent or by other means. At block 204, the application can be launched in the operating system and user interactions with the application can be simulated. As discussed above, the simulated user interactions can include interactions with the application such as clicks, touches, gestures, system-level events and the like. In one embodiment, the simulated user interactions can be generated to simulate a number of possible user interactions or all possible user interactions with the application in a predetermined amount of time. While the application is launched and the user interactions are simulated, any resource requests made by the application can be logged in the log initiated at block 203.

Blocks 205-209 represent a loop that can be used to determine whether the resources designated for the application should be deemed to be actual resources used by the application. At block 205, the first designated resource for the application can be queued. At block 206, a determination can be made whether sufficient instances of the designated resource appear in the log of resource requests that was created during the launch of and simulated user interactions with the application. As discussed above, one instance of a resource request for the designated resource in the log may be sufficient, a predetermined number of instances of resource requests for the designated resource in the log may be sufficient and a predetermined percentage of the resource requests for the declared resource to the total resource requests in the log may be sufficient. Any other manner of determining whether there are sufficient instances of resource requests for the designated resources in the log may be used. If, at block 206, it is determined that there are sufficient instances of the designated resource in the log, then, at block 207, the designated resource can be added to a list of actual resources for the application and the method can proceed to block 208. However, if at block 206, it is determined that there are not sufficient instances of the designated resource in the log, then the method bypasses block 207 (i.e., the designated resource is not added to a list of actual resources for the application) and the method can proceed to block 208.

At block 208, a determination can be made whether the method has reached the end of the designated resources for the application. If the method has not reached the end of the designated resources for the application, the method proceeds to block 209 where the next designated resource for the application is queued. After block 209, the method proceeds back to block 206 to determine whether sufficient instances of the next designated resource are in the log and the method can proceed from 206 as previously described. Returning back to block 208, if the method has reached the end of the designated resources for the application, the method can proceed to block 210. In the loop represented by blocks 205-209, the method should examine whether each of the designated resource for the application should be added to the list of actual resources for the application. At the end of the loop, when the method proceeds to block 210, the list of the actual resources for the application should be complete.

At block 210, a determination can be made whether the method has reached the end of the applications in the set. If the method has not reached the end of the applications in the set, the method proceeds to block 211 where the next application in the set is queued. Queuing the next application can include one or more of downloading the next application onto a computing device, installing the application on an operating system, configuring the operating system to log resource requests by applications and the like. After block 211, the method proceeds back to block 203 where a log of resource requests for the next application can be initiated and the method can proceed from block 203 as previously described. Returning back to block 210, if the method has reached the end of the designated resources for the application, the method can end. In the loop represented by blocks 202-211, the method should launch and simulate user interactions with each of the applications in the set, log resource requests made by the application during launch of and simulated user interactions with each of the applications in the set, and a list of actual resources for each of the applications in the set should be complete. Thus, after performance of the method 200 depicted in FIG. 2, each of the applications in the set of applications can be published according to the list of actual resources determined during the method 200.

Figure 3:
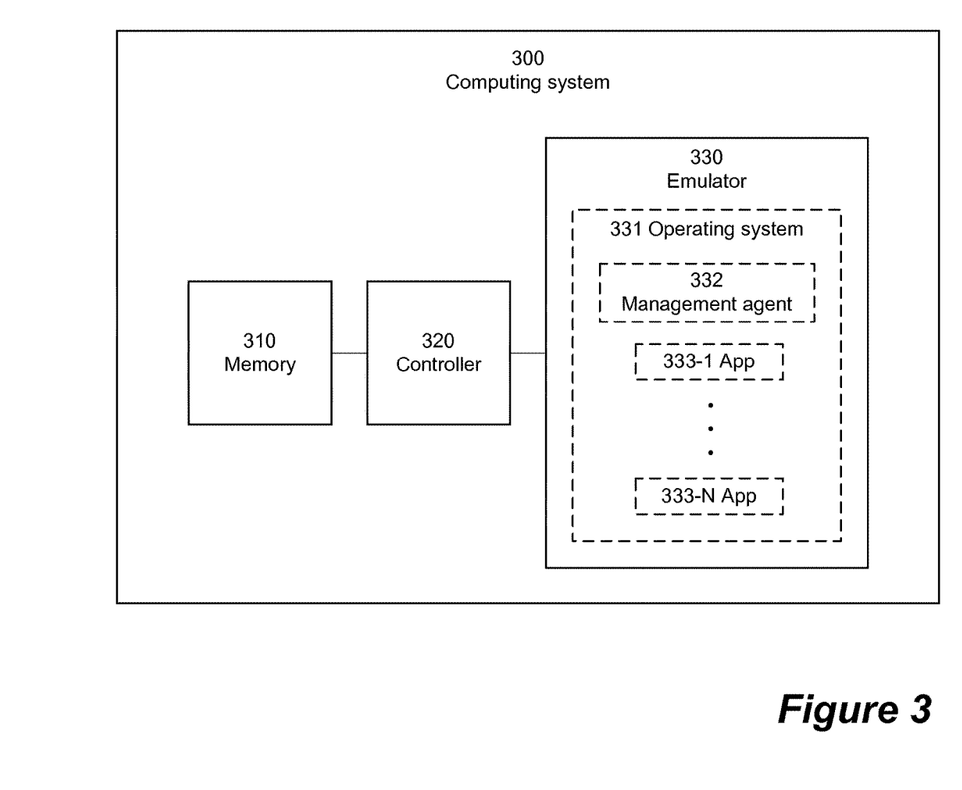
FIG. 3 depicts an embodiment of a system that can determine actual resources used by an application with an emulator.

FIG. 3 depicts an embodiment of a computing system 300 that can determine actual resources used by an application with an emulator. The computing system 300 depicted in FIG. 3 includes one or more memories 310, a controller 320 and an emulator 330. The emulator 330 can include hardware, software or a combination of hardware and software that emulates functions of a first computing system in a second computer system. Emulators can be designed so that the emulated functions are similar to the functions that would be performed by an actual one of the first computing systems. In one embodiment, the computing system 300 could be a non-mobile computing device, such as a desktop computing device or a server computing device, and the emulator 330 could emulate a mobile computing device, such as a cell phone computing device or a tablet computing device.

As depicted in FIG. 3, emulator 330 can include an operating system 331, a management agent 332, and one or more applications 333. The operating system 331 can be an operating system of the computing device emulated by emulator 330. For example, the emulated operating system could be an iOS operating system or an ANDROID operating system for a cell phone computing device or a tablet computing device emulated by emulator 330. The management agent 332 can be a tool that allows for control of the emulated computing device 330 remotely. For example, management agent 332 can manage operations performed by the emulated computing device 330, run shell commands on the emulated computing device 330, copy files to or from the emulated computing device 330 and the like. Management agent 332 can also simulate user interactions with the emulated computing device 330 by generating and executing events, such as clicks, touches, gestures, system-level events and the like. Management agent 332 can also provide reports, such as reports on the status of emulated computing device 330, reports about usage of emulated computing device 330, reports on status of components of the emulated computing device 330, and the like. One example of management agent 332 is the ANDROID Debug Bridge.

The controller 320 of computing system 300 can communicate with both the memory 310 and the emulator 330. The controller 320 can read data from and write data to the memory 310. The controller 320 can also send information to and receive information from the emulator 330. For example, the controller 320 can send instructions to emulator 330 for the management agent 332 to start logging resource requests from one of the applications 333, to launch one of the applications 333, to simulate user interactions with one of the applications 333 and so forth. The controller 320 can also receive, from emulator 330, a log of resource requests made by an application during launch of the application and during simulated user interactions with the application. The controller 320 can determine whether some or all of declared resources for an application are actual resources used by an application based on the log of resource requests received from the emulator 330. The controller 320 can also write a list of actual resources for an application to the one or more memories 310. The controller 320 can also instruct various components of computing system 300 to perform the embodiments of methods depicted in FIGS. 1 and 2.

Figure 4:
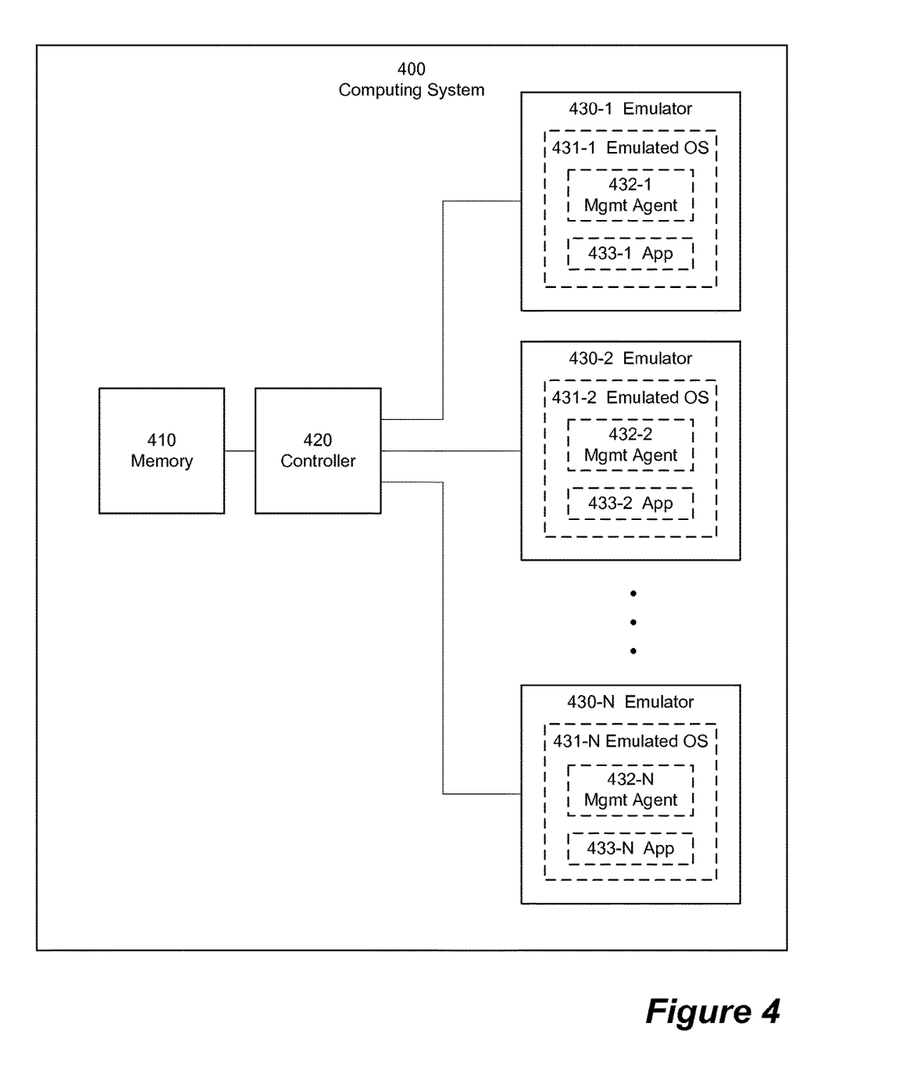
FIG. 4 depicts an embodiment of a system that can determine actual resources used by an application with a number of emulators.

FIG. 4 depicts an embodiment of a computing system 400 that can determine actual resources used by an application with a number of emulators. The computing system 400 depicted in FIG. 4 includes one or more memories 410, a controller 420, and a number of emulators 430-1, 430-2, . . . , 430-N. The controller 420 of computing system 400 can communicate with the one or more memories 410 to read data from and write data to the one or more memories 410. The controller 420 can also independently send information to and receive information from each of the emulators 430. Each of emulators 430 can include an operating system 431-1, 431-2, . . . , 431-N, a management agent 432-1, 432-2, . . . , 432-N, and one or more applications 433-1, 433-2, . . . , 433-N. The controller 420 can send instructions independently to each of the emulators 430 for the management agents 432 to start logging resource requests from applications 433, to launch applications 433, to simulate user interactions with applications 433 and so forth. The controller 420 can also receive, from emulators 430, logs of resource requests made by applications during launch of the applications and during simulated user interactions with the applications. The controller 420 can determine whether some or all of declared resources for applications are actual resources used by the applications based on the logs of resource requests received from the emulators 430. The controller 420 can also write lists of actual resources for the applications to the one or more memories 410.

The controller 420 can also instruct various components of computing system 400 to perform the embodiments of methods depicted in FIGS. 1 and 2. One benefit of using multiple emulators in a single system, as is the case with the system 400 depicted in FIG. 4, is that methods for determining actual resources for applications based on their declared resources can be performed independently and concurrently on multiple emulators. For example, the method 100 depicted in FIG. 1 can be performed in part by logging resource requests by a first application 433-1 during launch of the first application 433-1 and during simulated user interactions with the first application 433-1 on a first emulated computing system 430-1. Concurrently, the method 100 depicted in FIG. 1 can be performed in part by logging resource requests by a second application 433-2 during launch of the second application 433-2 and during simulated user interactions with the second application 433-2 on a second emulated computing system 430-2. In this manner, a set of applications can be tested in parallel on a number of different emulators, reducing the time that would be required to test the same set of applications in a system with one emulator such as the system depicted in FIG. 3.

Figure 5:
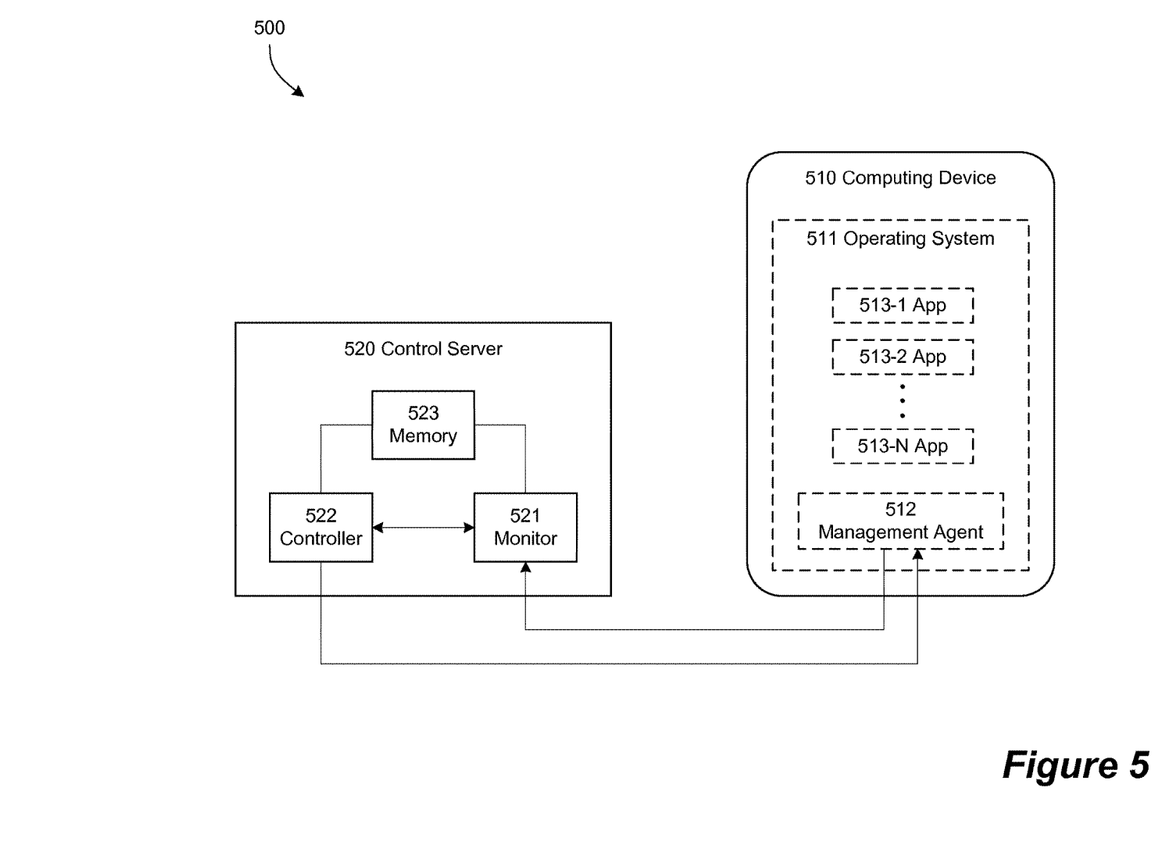
FIG. 5 depicts an embodiment of a system that can determine actual resources used by an application with a computing device in communication with a control server.

FIG. 5 depicts an embodiment of a system 500 that can determine actual resources used by an application with a computing device in communication with a control server. System 500 can include a computing device 510 and a control server 520. The computing device 510 can include an operating system 511, a management agent 512, and one or more applications 513-1, 513-2, . . . , 513-N. Control server 520 can include a monitor 521, a controller 522, and one or more memories 523.

Monitor 521 can receive information from the management agent 512, such as logs of resource requests made by applications. Monitor 521 can store logs of resource requests by applications in one or more memories 523. Controller 522 can communicate with monitor 521 and can write to and read from one or more memories 523. For example, controller 522 can determine actual resources used by an application based on a log of resource requests by the application and store the list of actual resources in the one or more memories 523. Controller 522 can also communicate with management agent 512 to instruct the computing device 510 to perform functions, such as downloading applications, launching applications, simulating user interactions with applications, logging resource requests of applications, and the like. In some embodiments, the controller 522 can also instruct various components of computing system 500 to perform the embodiments of methods depicted in FIGS. 1 and 2. The communication between computing device 510 and a control server 520 can be wired links, wireless links or any combination of wired and wireless links. For example, communication links can be wired local area network (LAN) links, wide area network (WAN) links, wireless links, such as Wi-Fi links, or any other type of link that can be used to communicate information.

Figure 6:
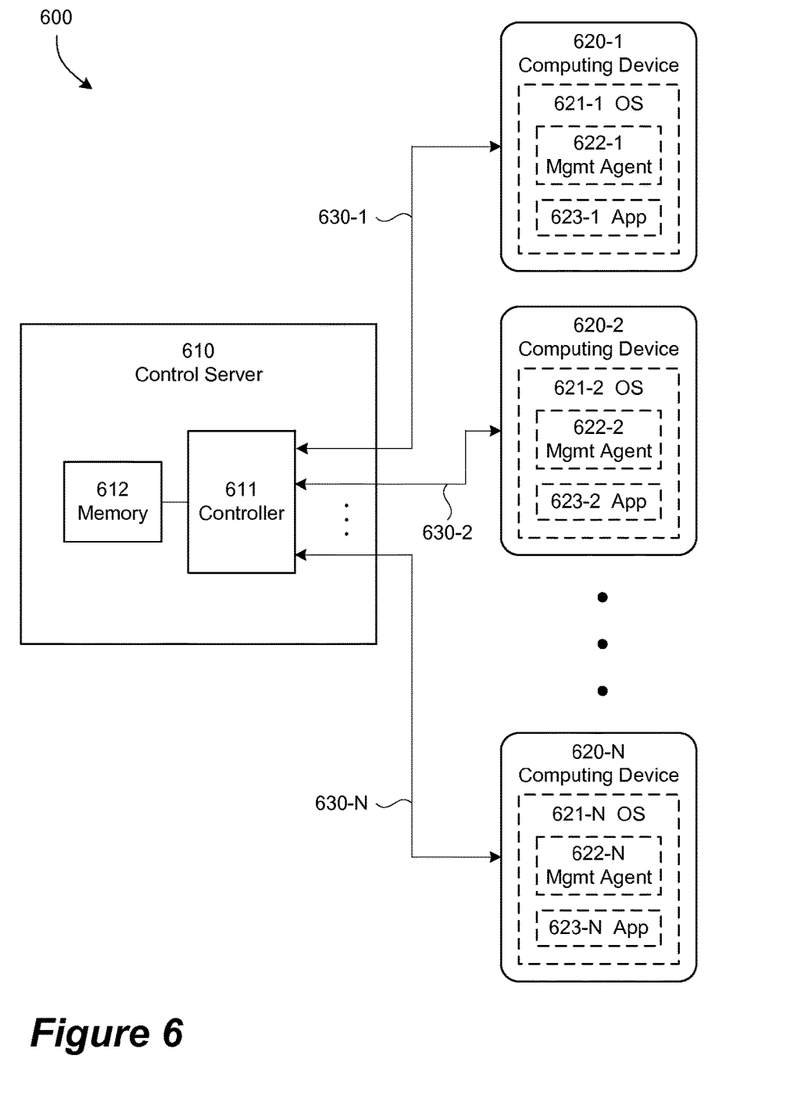
FIG. 6 depicts an embodiment of a system that can determine actual resources used by an application with a number of computing devices in communication with a control server.

FIG. 6 depicts an embodiment of a system 600 that can determine actual resources used by an application with a number of computing devices in communication with a control server. In the embodiment depicted in FIG. 6, system 600 includes a control server 610 and computing devices 620-1, 620-2, . . . , 620-N. Control server 610 includes a controller 611 and one or more memories 612. Controller 611 can be configured to perform each of the functions discussed above with respect to the monitor 521 and the controller 522 depicted in system 500 of FIG. 5. Each of the computing devices 620 can include an operating system 621-1, 621-2, . . . , 621-N, a management agent 622-1, 622-2, . . . , 622-N, and one or more applications 623-1, 623-2, . . . , 623-N. A communication link 630-1 can be established between controller 611 and computing device 620-1. A communication link 630-2 can be established between controller 611 and computing device 620-2. A communication link 630-N can be established between controller 611 and computing device 620-N. Communication links 630 can be wired links, wireless links or any combination of wired and wireless links. For example, communication links can be wired links, wireless links or any combination of wired and wireless links. For example, communication links can be wired local area network (LAN) links, wide area network (WAN) links, wireless links, such as Wi-Fi links, or any other type of link that can be used to communicate information.

Using the system 600 depicted in FIG. 6, the methods 100 and 200 depicted in FIGS. 1 and 2 can be performed with each computing device 620 in parallel. Controller 611 can independently send instructions to and receive information from each of computing devices 620 to perform some or all of the methods 100 and 200. For example, controller 611 can send instructions independently to each of the computing devices 620 for the management agents 622 to start logging resource requests from applications 623, to launch applications 623, to simulate user interactions with applications 623 and so forth. The controller 611 can also receive, from computing devices 620, logs of resource requests made by applications 623 during launch of the applications 623 and during simulated user interactions with the applications 623. The controller 611 can determine whether some or all of declared resources for applications 623 are actual resources used by the applications 623 based on the logs of resource requests received from the computing devices 620. The controller 611 can also write lists of actual resources for the applications to the one or more memories 612.

Figure 7:
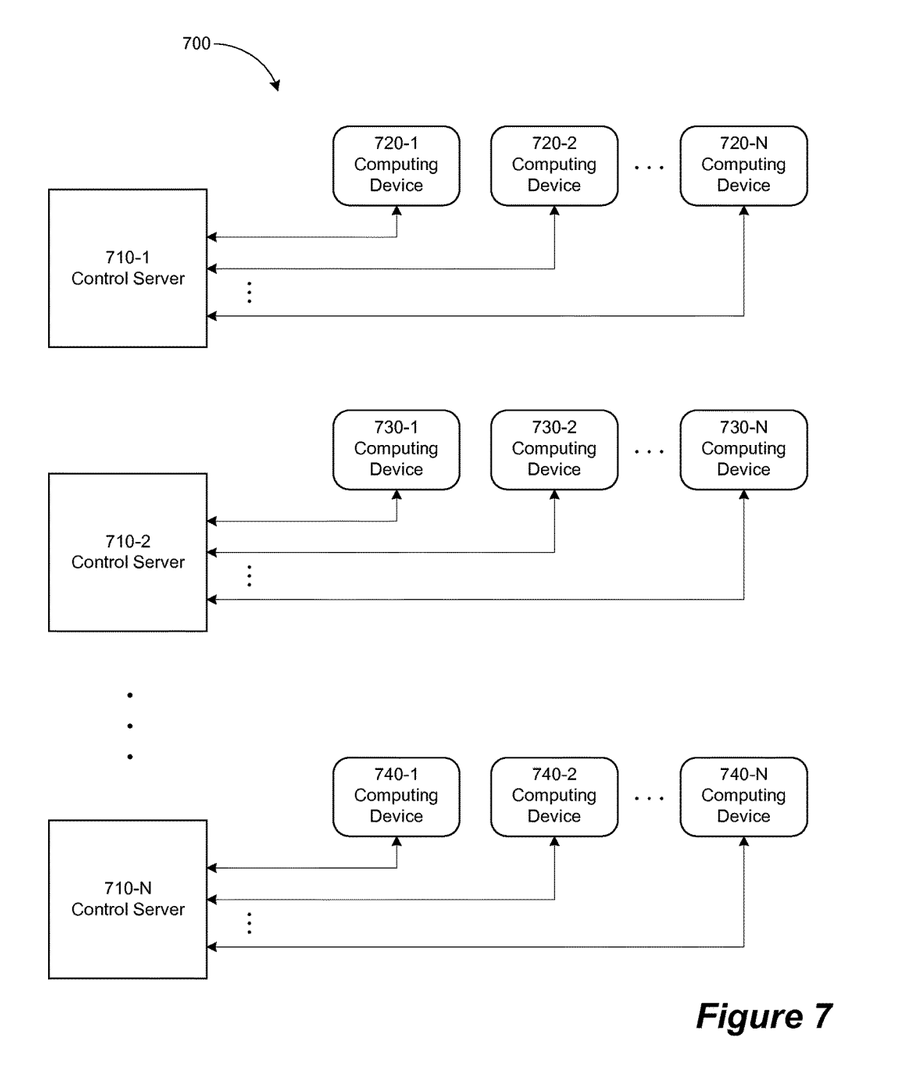
FIG. 7 depicts an embodiment of a system that can determine actual resources used by an application with a number of computing devices in communication with a number of control servers.

FIG. 7 depicts an embodiment of a system 700 that can determine actual resources used by an application with a number of computing devices in communication with a number of control servers. The system 700 includes a number of control servers 710-1, 710-2, . . . , 710-N, each of which are able to communicate with a number of computing devices 720, 730, and 740. Control server 710-1 can communicate independently with each of computing devices 720-1, 720-2, . . . , 720-N. Control server 710-2 can communicate independently with each of computing devices 730-1, 730-2, . . . , 730-N. Control server 710-N can communicate independently with each of computing devices 740-1, 740-2, . . . , 740-N. Control servers 710 can send instructions to computing devices 720, 730 and 740 to start logging resource requests from applications, to launch applications, to simulate user interactions with applications and so forth. The control servers 710 can also receive, from computing devices 720, 730 and 740, logs of resource requests made by applications during launch of the applications and during simulated user interactions with the applications. The control servers 710 can determine whether some or all of declared resources for the applications are actual resources used by the applications based on the logs of resource requests received from the computing devices 720, 730 and 740. The control servers 710 can also write lists of actual resources for the applications to the one or more memories.

Figure 8:
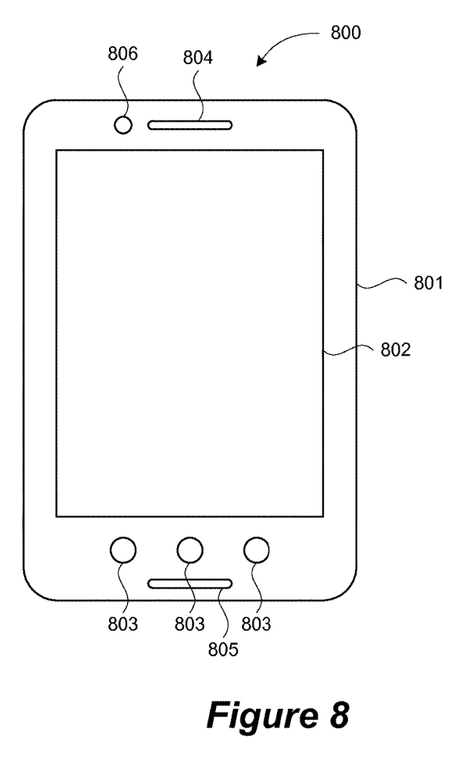
FIG. 8 depicts an embodiment of external components of a computing device.

FIG. 8 depicts an embodiment of external components of a computing device 800. It should be understood that this is merely an example for discussion, and that a number of additional components, configurations, assemblies and combinations are possible as known in the art. Computing device 800 can be any form of a computer, such as a desktop computer or laptop computer, a tablet computing device, a cell phone, a handheld computing device or any other form of computing device. Computing device 800 can include a housing 801. The housing 801 can be made of any material or combinations of materials, such as various types of plastic, metal, glass and combinations thereof, that is suitable to house the components of device 800. Computing device 800 can also include a display 802 that can display images, text, any other type of visual information and any combination thereof. Display 802 can also be a touchscreen display that is capable of sensing the presence and location of one or more touches of the display 802. A touchscreen display can sense touches by a user, such as a touch by a finger or a hand, and touches by objects, such as a stylus. Display 802 can be part of a user interaction system of the computing device 800.

Computing device 800 can also include one or more hard buttons 803 integrated into housing 801. In one embodiment, the one or more hard buttons 803 can include a single button, such as a home button or a power button. In another embodiment, the one or more hard buttons 803 can include a small set of buttons, such as a power button, a home button, and a back button. In yet another embodiment, the one or more hard buttons 803 can include a large set of buttons, such as a full QWERTY keyboard, a keypad, and the like. The one or more hard buttons 803 can be part of the user interaction system of the computing device 800.

Computing device 800 can also include a speaker 804 configured to emit sounds and a microphone 805 configured to receive sounds. In the embodiment where computing device 800 is a cell phone, speaker 804 and microphone 805 can be used to carry on a telephone call. In one embodiment, speaker 804 can be configured to play sounds associated with graphics displayed on display 802, such as during play of audiovisual material on computing device 800. In another embodiment, microphone 805 can receive audio sounds which the computing device 800 can interpret as user inputs. In addition, while not depicted in FIG. 8, computing device 800 can also include an audio port which can be connected to an external microphone and/or an external speaker or speakers. Computing device 800 can send and receive audio signals via the audio port and interpret the received audio signals via the audio port just as it would interpret audio signals generated from sounds received by the microphone 805.

Computing device 800 can also include one or more optical devices 806. In one embodiment, an optical device can include an optical sensor, such as an infrared sensor, a visible light sensor and/or any device that can sense light and/or electromagnetic energy. The detection of light and/or electromagnetic energy can be used by the computing device 800 to control components of the computing device 800, such as a level of light emitted by a backlight of display 802, illumination of one or more hard keys 803 and any other aspect of computing device 800. In another embodiment, an optical device can include an image-capturing device, such as a digital camera. An image-capturing device can include any device configured to capture an image, such as a complementary metal-oxide-semiconductor (CMOS) active pixel sensor (APS) and a charged coupled device (CCD). Images captured by one or more optical devices 806 can be stored by the computing device 800 as individual images or as a series of images in a video. Individual images and/or video images can be processed by computing device 800 and interpreted as user inputs. While FIG. 8 depicts one optical device 806 pointing in the same direction as the display 802, it is possible for computing device 800 to have any number of optical devices 806 and it is possible for one or more optical devices 806 to be pointed in other directions, such as a rear-facing camera pointing in the opposite direction of display 802.

Figure 9:
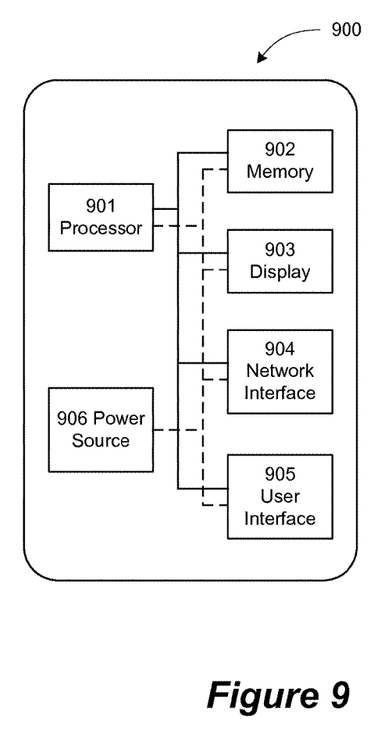
FIG. 9 depicts an embodiment of internal components of a computing device.

FIG. 9 depicts an embodiment of internal components of a computing device 900. It should be understood that this is merely an example for discussion, and that a number of additional components, configurations, assemblies and combinations are possible as known in the art. Computing device 900 can include at least one processor 901 that is able to execute instructions stored in one or more memories 902. The one or more memories 902 can include instructions for running an operating system, instructions for running one or more applications within the operating system, a system management agent and any other kind of instructions. The at least one processor 901 can generate information on a display component 903. Display component 903 can include one or more of a display driver, a display card, display 802 from FIG. 8, or any other hardware and/or software required to display an image or series of images. Computing device 900 can also include a network interface 904 that allows the device to send and receive information signals via a network. Network interface 904 can include any type of network adapter for connecting to a network, such as an adapter to establish a connection to the Internet, to a wired or wireless intranet, to a cellular network or to a wireless network. Computing device 900 can also include a user interface 905. User interface 905 can include one or more components from FIG. 8, such as display 802, one or more hard buttons 803, speaker 804, microphone 805 and optical devices 806, that can provide information to a user and/or receive inputs from a user. User interface 905 can also include one or more external components, such as an external keyboard, external mouse, external microphone, external speaker and the like.

Computing device 900 can include at least one power source 906. Power source 906 can provide power to any or all of the other components in computing device 900. As depicted in FIG. 9, power source 906 can be connected to, and provide power to, each of processor 901, memory 902, display 903, network interface 904 and user interface 905. Power source 906 can be any type of power source, such as one or more disposable batteries, a rechargeable battery and the like. In the embodiment where computing device 900 is a portable device, such as a laptop computer, a tablet computer, a cell phone, a hand held computer and the like, the power supply 906 may need to provide power for a period of time between recharging of the power source 906. When power source 906 is not connected to an external power source, computing device 900 is drawing on the power stored in power source 906. The capacity of power source 906 can vary with the type and size of power source 906. The rate at which power source 906 discharges depends on a number of factors, such as which components of computing device 900 are active, how much power each of the active components are drawing from power source 906, and the like.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for determining a set of actual resources for an application, the method comprising:
    receiving, by a computing system, an application;
    receiving, by the computing system, a set of declared resources declared to be required for the application;
    sending instructions from the computing system to an operating system to launch the application and to simulate user interactions with the application;
    sending instructions from the computing system to the operating system to configure the operating system to generate a log of resource requests for the set of declared resources by the application during launch of the application and during the simulated user interactions with the application;
    determining, by the computing system, whether resource requests to each declared resource in the set of declared resources occurs a predetermined number of times in the log of resource requests; and
    generating, by the computing system, a set of actual resources, the set of actual resources comprising each of the set of declared resources determined to have resource requests occurred the predetermined number of times in the log of resource requests by the application, wherein the application is published to users of computing devices that can provide the set of actual resources to the application.

2. The method of claim 1 wherein a management agent of the operating system is configured to log requests for declared resources from one or more applications.

3. The method of claim 1, further comprising:
    generating, by the computing system, the simulated user interactions before sending the instructions from the computing system to the operating system to simulate user interactions with the application.

4. The method of claim 1, wherein publishing the application comprises making the application discoverable to users of the computing devices that can provide the set of actual resources.

5. A system comprising:
    one or more memories; and
    a computer controller in communication with the one or more memories, the controller configured to:
        receive an application;
        receive a set of declared resources declared to be required for the application;
        send instructions to an operating system to launch the application and to simulate user interactions with the application;
        send instructions to the operating system to configure the operating system to generate a log of resource requests for the set of declared resources by the application during launch of the application and during the simulated user interactions with the application;
        determine whether resource requests to each declared resource in the set of declared resources occurs a predetermined number of times in the log of resource requests; and
        generate a set of actual resources, the set of actual resources comprising each of the set of declared resources determined to have resource requests occurred the predetermined number of times in the log of resource requests by the application, wherein the application is published to users of computing devices that can provide the set of actual resources to the application.

6. The system of claim 5, wherein the predetermined number is a predetermined percentage of instances of resource requests for each declared resource in the log to the total instances of resource requests in the log.

7. The system of claim 5, further comprising:
    a first emulator and a second emulator, the first and second emulators being configured to emulate functions of one or more computing devices, wherein the controller is configured to communicate with the first emulator independently of the second emulator.

8. The system of claim 7, wherein a first operating system is configured to operate within the first emulator, and wherein a second operating system is configured to operate within the second emulator.

9. The system of claim 8, wherein the controller is further configured to communicate with the first emulator and the second emulator in parallel and to:
   send, to the second operating system, instructions configured to launch a second application, to simulate user interactions with the second application, and to generate a second set of stored resource requests by the second application during launch of the second application and during the simulated user interactions with the second application,
   determine, for each resource in a third set of resources, whether a predetermined number of resource requests for each resource is in the second set of stored resource requests, and
   store a fourth set of resources in the one or more memories, the fourth set of resources comprising one or more resources from the third set of resources, wherein the predetermined number of resource requests for the one or more resources is determined to be in the second set of stored resource requests.

10. The system of claim 5, wherein the system is configured to communicate with the computing devices, and wherein the operating system is configured to operate on the computing devices.

11. The system of claim 10, wherein the operating system comprises a management agent.

12. The system of claim 11, wherein the management agent is configured to launch the application, to simulate the user interactions with the application, and to store the resource requests by the application.

13. The system of claim 11, wherein the management agent is configured to generate the simulated user interactions.

14. The system of claim 10, wherein the computing devices are mobile computing devices.

15. The system of claim 5, wherein the system is configured to communicate independently with each of a plurality of computing devices.

16. A non-transitory computer-readable storage medium having stored thereon computer readable instructions, the computer-readable instructions comprising instructions that, upon execution on a computing device, at least perform:
   receiving, by a computing device, an application;
   receiving, by the computing device, a set of declared resources declared to be required for the application;
   sending instructions from the computing device to an operating system to launch the application and to simulate user interactions with the application;
   sending instructions from the computing device to the operating system to configure the operating system to generate a log of resource requests for the set of declared resources by the application during launch of the application and during the simulated user interactions with the application;
   determining, by the computing device, whether resource requests to each declared resource in the set of declared resources occurs a predetermined number of times in the log of resource requests; and
   generating, by the computing device, a set of actual resources, the set of actual resources comprising each of the set of declared resources determined to have resource requests occurred the predetermined number of times in the log of resource requests by the application; and
   publishing the application to client devices able to provide the set of actual resources to the application.

17. The non-transitory computer-readable storage medium of claim 16, wherein the determining comprises determining whether a predetermined percentage of instances of resource requests for each declared resource in the log to the total instances of resource requests is in the log.

18. The non-transitory computer-readable storage medium of claim 16, wherein receiving the application and the set of declared resources for the application comprises receiving a set of applications and a first set of resources for each application in the set of applications.

19. The non-transitory computer-readable storage medium of claim 18, the computer-readable instructions further comprising instructions that, upon execution on the computing device, at least cause:
   after generating the set of actual resources, determining, by the computing device, whether a second set of resources has been generated for each application in the set of applications.

20. The non-transitory computer-readable storage medium of claim 19, the computer-readable instructions further comprising instructions that, upon execution on the computing device, at least cause:
   in response to determining that the second set of resources has not been generated for a second application in the set of applications, performing the following:
   sending, by the computing device, instructions to the operating system to generate a second set of stored resource requests by the second application during launch of the second application and during simulated user interactions with the second application;
   receiving, by the computing device, the second set of stored resource requests by the second application;
   determining, by the computing device, whether each resource in the first set of resources for the second application is deemed to be required by the second application based at least in part on the second set of stored resource requests; and
   generating, by the computing device, a second set of actual resources for the second application, the second set of actual resources for the second application comprising resource from the first set of resources for the second application deemed to be required by the second application.

21. The non-transitory computer-readable storage medium as recited in claim 16 wherein the set of declared resources comprises a set of plurality of different types of computing resources specified as required for the application to operate.

* * * * *